D. S. FOLEY.
POTATO CUTTING MACHINE.
APPLICATION FILED AUG. 7, 1918.
1,327,316.
Patented Jan. 6, 1920.
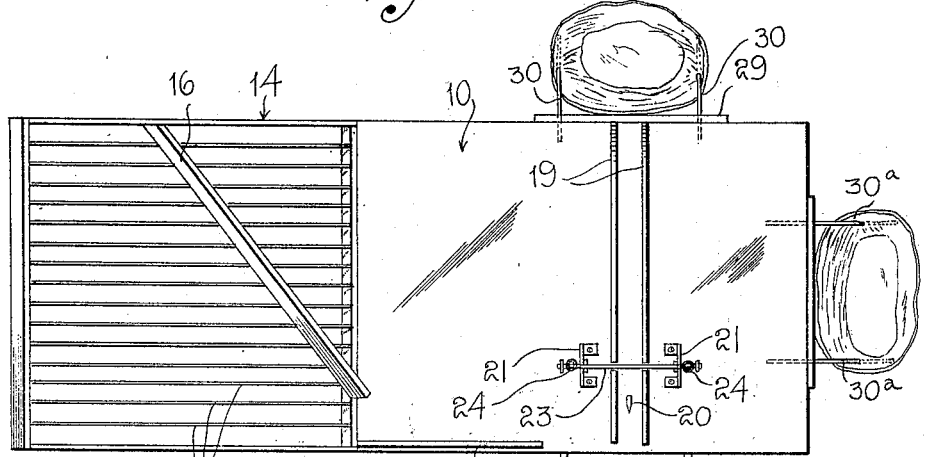
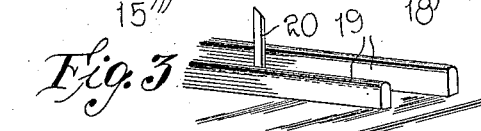
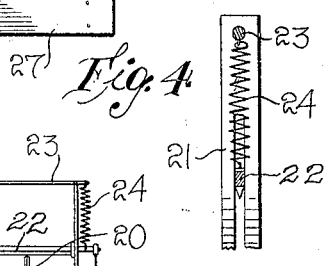
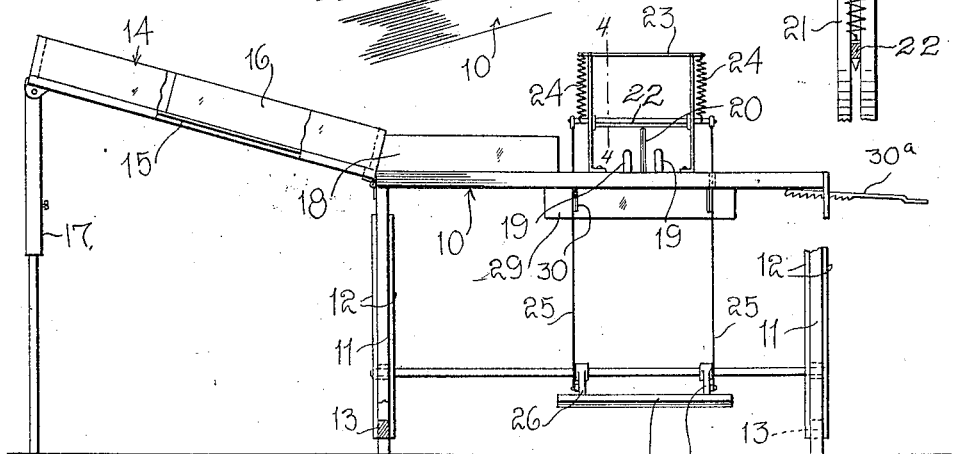
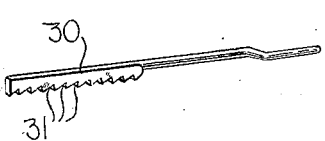
Inventor
D. S. Foley
By Watson E. Coleman
Attorney

UNITED STATES PATENT OFFICE.

DOLLNER S. FOLEY, OF MONTROSE, COLORADO.

POTATO-CUTTING MACHINE.

1,327,316.  Specification of Letters Patent.  Patented Jan. 6, 1920.

Application filed August 7, 1918. Serial No. 248,741.

*To all whom it may concern:*

Be it known that I, DOLLNER S. FOLEY, a citizen of the United States, residing at Montrose, in the county of Montrose and State of Colorado, have invented certain new and useful Improvements in Potato-Cutting Machines, of which the following is a specification, reference being had to the accompanying drawings.

This invention relates to vegetable cutters, and particularly to means for cutting up or quartering seed potatoes.

The general object of the invention is to provide a very simple and easily operated machine whereby seed potatoes may be readily cut up for planting.

A further object is to provide a construction of this kind embodying a table, a bin discharging upon the table, a vertical knife for cutting each potato in half, and a vertically reciprocating transverse knife whereby each half of the potato is cut longitudinally, thus quartering the potato, the transverse knife being vertically reciprocated by means of a treadle.

A further object is to provide in connection with the table, means whereby sacks may be supported for the potatoes, means whereby the potatoes may be guided to the knives, and means whereby the bin from which the potatoes are discharged may be disposed into or out of operative position.

Other objects will appear in the course of the following description.

My invention is illustrated in the accompanying drawings, wherein:—

Figure 1 is a top plan view of a potato cutting machine constructed in accordance with my invention;

Fig. 2 is a front elevation partly broken away of the construction shown in Fig. 1;

Fig. 3 is a fragmentary perspective view of a portion of a table;

Fig. 4 is a fragmentary section on the line 4—4 of Fig. 2; and

Fig. 5 is a perspective view of one of the bag supporting members.

Referring to these drawings, 10 designates a table which may be four feet long and three feet wide and which is supported upon legs 11 braced from each other by braces 12 and having cross bars 13. To one end of the table is hinged a bin or trough designated 14, which is designed to contain about 200 pounds of potatoes more or less and the bottom of which is formed with slats 15. This trough is normally elevated at an angle so that the potatoes will roll down by gravity to the discharge end of the trough and the bottom of the trough is preferably made of slats spaced from each other so that dirt and other foreign matter adhering to the potatoes will be disengaged from the potatoes and discharged.

The bin 14 has at its lower end an angular partition or wall 16 so as to cause the potatoes to discharge toward the front of the table and at one side thereof. The table is supported in its inclined position by means of hinged legs 17 and at the front of the table, adjacent the bin, there is provided the upright wall 18 which prevents the potatoes from falling off the table and which guides them to the operator's hand.

Extending across the table is a potato track composed of two parallel strips 19 which extend to the rear edge of the table and which may be made of wood and nailed to the top of the table. Disposed between these strips 19 is a vertical knife 20, the edge of which is directed toward the operator, this knife being of any desired height such that it will cut the potato in two when it is pressed against the knife. Extending upward from the table on each side of the knife 20 and rearward thereof are vertically slotted guides 21, these guides being attached in any suitable way to the top of the table, and operating within these guides is a horizontal knife 22 which is transversely disposed with relation to the knife 20.

Across the top of the guides 21 extends a cross bar 23 and coiled springs 24 are attached to this cross bar and engaged with the knife 22 so as to urge it upward into inoperative position. Cables or like flexible connections 25 are attached to the ends of the knife 22, these cables passing downward through the table and being attached to treadle arms 26 attached to a longitudinal rock shaft 27 which in turn is mounted in bearings in the transverse braces 13. These arms 26 are connected by means of a treadle 27 and when the operator depresses his foot, it will be obvious that the knife 22 will be drawn downward against the table, thus cutting the potato which may be disposed on the tracks 19 and that when the operator releases the foot, the springs 24 lift the knife 22. The knife is held from lateral movement by collars 28 riveted or otherwise attached to the knife so that there is no chance of the knife sliding longitudinally.

Disposed at the rear edge of the table and extending below the rear edge is a plate 29 and coacting with this plate are the bag holders 30, each of which is formed with a point at its outer end and with notches 31 which engage with the plate 29 and lock against this plate. These bag holder arms 30 extend under the table and may be adjusted so as to support bags of various diameters. Like holders 30ª are disposed at the end of the table opposite the bin 14 to support a bag which receives the culls.

The operation of my machine will be obvious. The operator sits in front of the table and as the potatoes are discharged against the wall 18, he takes the potatoes one by one, places them upon the tracks 19, forces the potatoes forward against the knife 20, which cuts the potato in two. The knife 22 is located rearward of the knife 20 and thus when the potato has been split or cut in two by the knife 20 it is in position to be cut longitudinally by the knife 22. This is accomplished by depressing the treadle 27. The potato is thus quartered and as soon as the pressure on the treadle has been released and the springs cause the knife 22 to rise, the operator pushes the quartered potato into the sack carried by the supports 30. The operator throws the culls aside into the sack supported by the members 30ª. It will be seen that this device is very simple and convenient. The trough or bin 14, as it is hinged, may be turned over upon the table when not in use.

I claim:—

1. A potato quartering machine comprising a table, a track extending transversely of the table and of sufficient width to receive and guide a potato, a knife extending upward from the table between the track and arranged to divide the potato, a longitudinally extending knife transverse of the first named knife and rearward thereof and mounted for vertical movement and arranged to divide the divided portions of the potato, and manually operated means for reciprocating the second named knife.

2. A potato quartering machine comprising a table, a trackway extending transversely of the table and of sufficient width to receive and guide a potato, a knife extending upward to the middle of the trackway and coöperating with the trackway to equally divide the potato, vertical guides rearward of the knife and on each side of the trackway, a vertically movable knife disposed in said guides and arranged to equally divide the divided portions of the potato, springs urging the last named knife upward, and a means mounted upon the table and operatively connected to the second named knife to cause its descent.

In testimony whereof I hereunto affix my signature in the presence of two witnesses.

DOLLNER S. FOLEY.

Witnesses:
CLARENCE WILLIAMS,
CHARLES L. BROSH.